United States Patent Office 2,840,344
Patented June 24, 1958

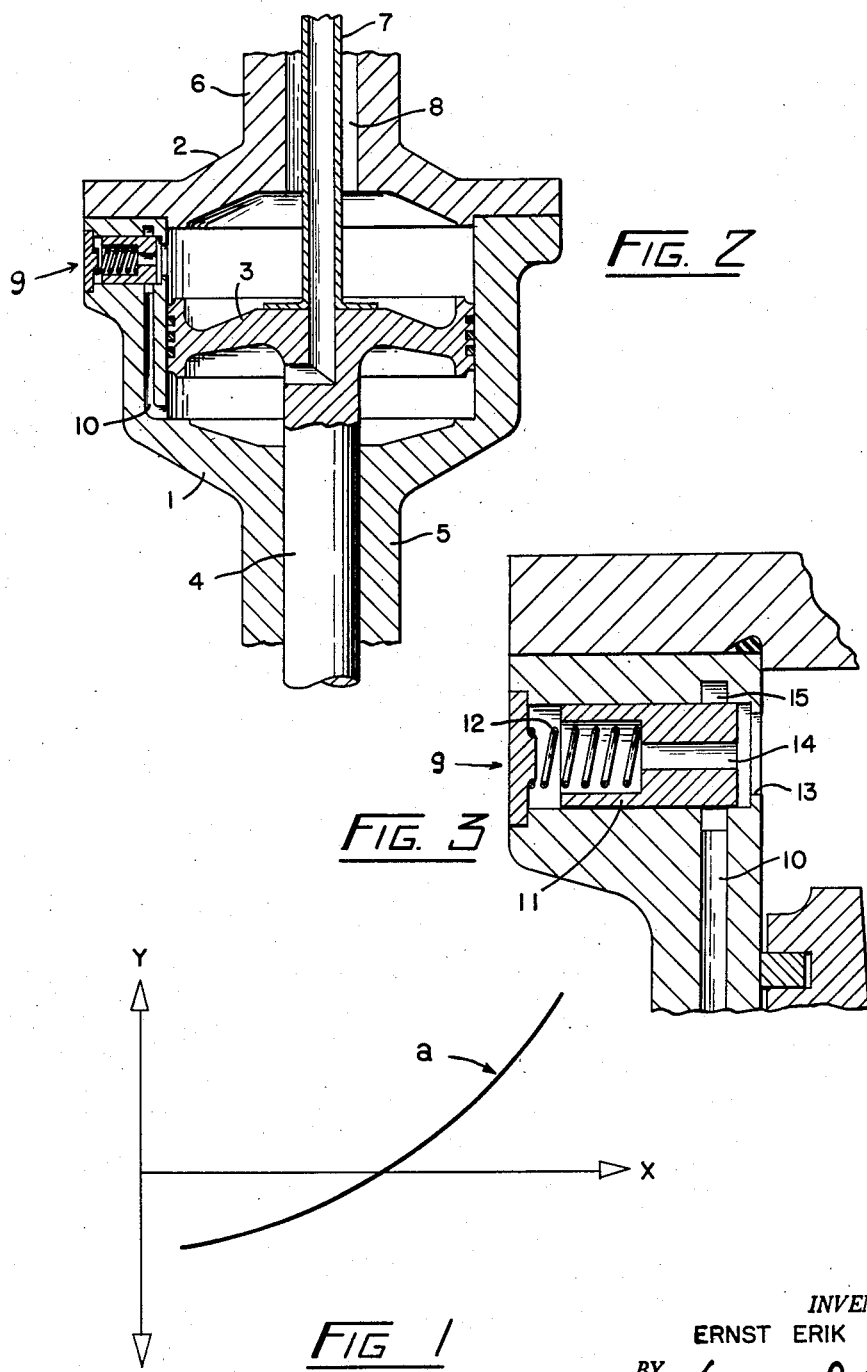
INVENTOR.
ERNST ERIK STAGE

2,840,344

DEVICE FOR REDUCTION OF RUNAWAY SPEEDS OF PROPELLER TURBINES WITH ADJUSTABLE RUNNER BLADES

Ernst Erik Stage, Trollhattan, Sweden, assignor to Nydqvist & Holm Aktiebolag, Trollhattan, Sweden, a corporation of Sweden Application February 25, 1953, Serial No. 338,819

Claims priority, application Sweden March 6, 1952

16 Claims. (Cl. 253—143)

The present invention relates to a device for the limitation of the high runaway speeds which under certain circumstances arise in propeller turbines with adjustable runner blades. Such a limitation is obtained by the runner blades, which are balanced in relation to their rotating axes, in some appropriate way being rotated up to the maximum runner blade angle at a certain increase of the speed, automatically and independent of the normal regulating devices, whereby the runaway speeds cannot exceed twice the normal speed, even when the guide vane is entirely open, while the runaway speeds, if the runner blades are left at a smaller angle, can amount to 2.5 times the normal speed, or still higher speeds.

As the rotating parts must be dimensioned with consideration to the highest speed that will occur, and as the stresses change by the square of the rotating speed, the reduction of the runaway speed is of great economic importance, especially as regards the electrical generator connected to the turbine.

By means of an appropriate extension of the axle centres around which the runner blades turn, the turning moment around the said axles, which is caused by the distribution of the water pressure on the blade surface, at normal operation can become 0. This, however, applies only to the normal rotating speed of the turbine and at the right combination, i. e. a correctly set angle of the runner blade in relation to the guide vane opening. If the speed is increased to more than the normal speed, the water pressure on the blade is changed in such a way that a turning moment arises, which strives to turn the runner blades to a greater angle, or to open the blades, as this is usually termed. If the rotating speed falls below the normal speed, there will arise a turning moment on the blades that strives to close them.

In the accompanying drawing a preferred embodiment of the invention is shown by way of illustration and not by way of limitation.

In the drawing:

Fig. 1 is a graph showing the hydraulic torque acting upon the runner blades of the turbine.

Fig. 2 is a sectional view of the safety means according to the invention coacting with the governor of the turbine.

Fig. 3 is a sectional fragmentary view of Fig. 2 on an enlarged scale, and

Figure 4:
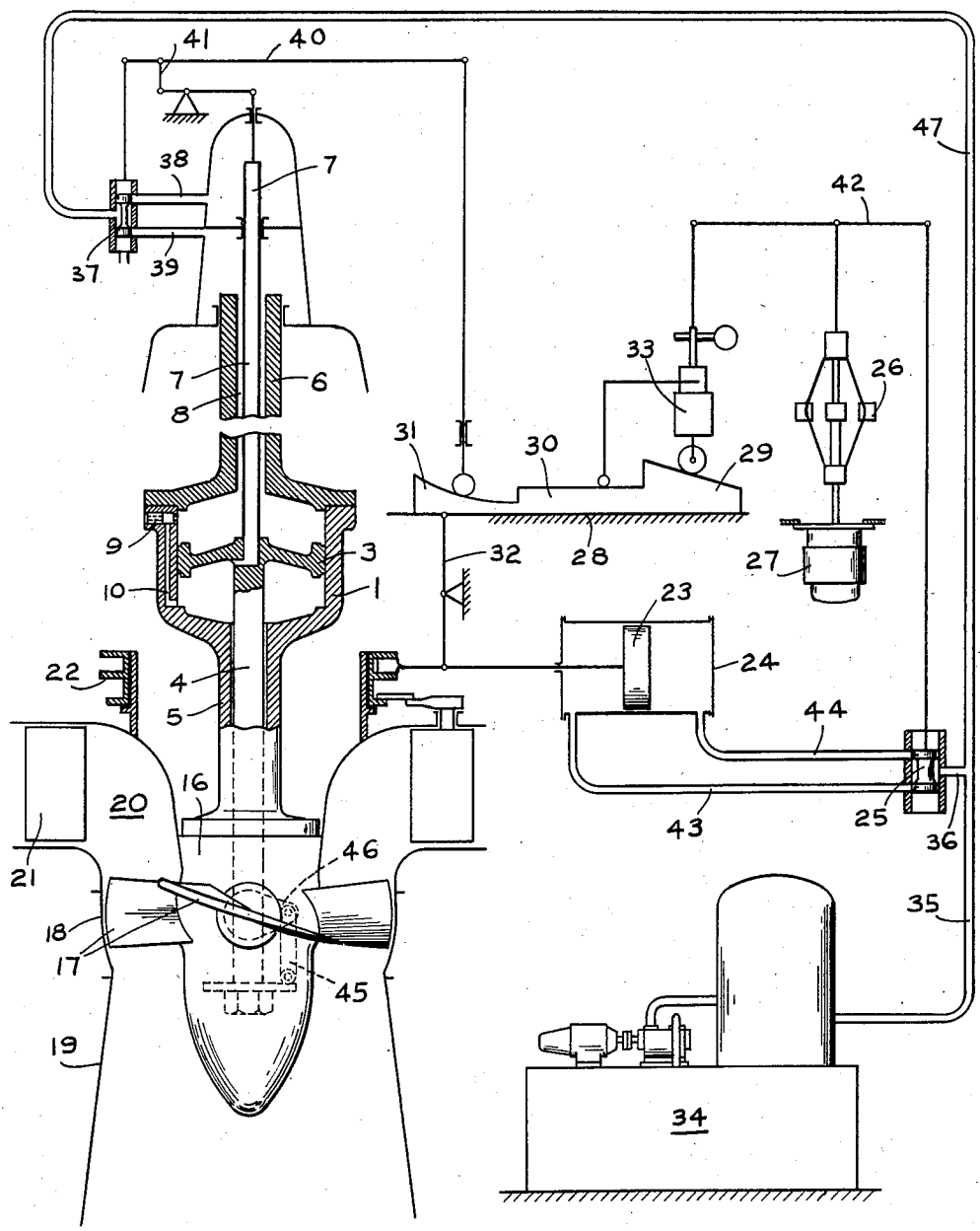
Fig. 4 shows diagrammatically the governor system with which the safety means of the invention coact.

In the diagram of Fig. 1. the curve $a$ shows the hydraulically turning moment as a function of the rotating speed of the turbine, set off on the $x$ axis. The turning moments set off on the positive branch of the $y$ axis represent moments in an opening direction, while the negative values show moments in a closing direction. Similar values are obtained also when the combination of the angle of the runner blade and the guide vane opening is incorrect. If the guide vane opening is greater than as to correspond to the correct combination with the existing runner blade angle, a moment in an opening direction is obtained, and if the guide vane opening is smaller than as to correspond with the correct combination, a closing moment is obtained.

The conditions for the obtaining of the maximum runaway speed, i. e. a full guide vane opening and a comparatively small runner blade angle (10–15°) and the increased rotating speed, thus collaborate towards the blades' turning in the desired direction. An increase of the rotating speed of only about 30% is sufficient for the turning moment on the blades in the opening direction to become great enough to be able to overcome the frictional resistance in the movement mechanisms for the blades. However, the setting of the blades is determined by a servomotor for the runner blades, which is connected with the blades. If the servomotor is set for closing of the blades, they cannot be opened by the influence of the hydraulic moment. Thus the regulating influence of the servomotor must in some way be counteracted.

Fig. 2 shows a design according to the invention, of a runner blade servomotor with a device that under certain conditions causes the servomotor to cease to function. A servomotor cylinder 1, with the cover 2, is built into the rotating axle system. The axially movable servomotor piston 3 is connected with the turning mechanisms of the runner blades in the blade wheel by the servomotor rod 4, positioned in a central hole in the turbine axle 5. For instance, it can be assumed that when the servomotor piston 3 moves downwards, the runner blades are opened, and that when the said piston moves upwards, the runner blades are closed.

In this case, the oil is fed to the servomotor through a central pipe 7, positioned in a hole in the upper axle section 6, and through the ring-shaped channel 8 between the pipe 7 and the hole in the axle. When oil is fed into the pipe 7 an overpressure is obtained on the bottom of the piston, the piston moves upwards, and the oil on top of the piston flows out through the channel 8. If oil comes in through the channel 8, the piston will move downwards, and the oil under the piston will flow out through the pipe 7.

Referring to Fig. 4, this figure shows a governing system according to the invention applied to a conventional hydraulic turbine of the adjustable runner blade propeller type (Kaplan turbine).

The turbine is provided with a hub 16 in which are journalled the angularly movable runner blades 17. The blades are connected by links 45 and levers 46 with the operating rod 4 which extends upwardly through the hollow turbine shaft 5 to the servomotor piston 3 movable within the servomotor cylinder 1, which is formed as a part of the shaft 5.

The runner blades 17 and hub 16 are enclosed by a discharge ring 18, the lower part of which is connected to a draft tube 19 and the top of which to a guide vane device 20. This device comprises the movable guide vanes 21 connected by a linkage with a shifting ring 22 mounted on the turbine casing for movement into different positions to control the flow of water to the turbine. The shifting ring 22 is connected to and actuated by a piston 23 movable within a cylinder 24, the piston and the cylinder constituting a fluid pressure operated servomotor controlled by a pilot valve 25. This valve is connected to a centrifugal governor 26 driven by a motor 27 responsive to the speed of the turbine. A sliding device 28 with three cams 29, 30, 31 is connected through a lever 32 with the rod of the piston 23. The cams 29 and 30 coact with a dashpot 33 and form the feed back for the device controlling the guide vanes. The fluid- or oil-pressure is supplied to the servo system from a pressure unit 34 through pipes 35 and 36. Pressure oil is supplied to the device controlling the angular position of the runner blades through the pipe 47 and the pilot valve 37 from which oil is transmitted either through pipe 38 and the tube 7 to the lower side of the piston 3 or through pipe 39 and passage 8 formed in the generator shaft 6 to the upper side of the piston 3. The pilot valve 37 is actuated by the cam 31 through a lever 40 and associated links. The lever 40 is pivoted to a link 41 connected with the axially movable tube 7 together with piston 3 thus forming the feed back in the governing device for the runner blades. The operation of the governing system is as follows:

If the load on the turbine decreases, the rotating speed of the same will increase. As a result, the speed of governor 26 increases correspondingly causing the pilot valve 25 to move downwards thereby permitting the pressure oil to pass through the pipe 43 to the servomotor cylinder 24. The pressure causes the piston 23 to move to the right, as seen in the figure, thereby actuating the guide vanes 21 to turn in the closing direction. This causes the flow of water through the turbine to decrease in response to the reduced load. The oil behind the piston 23 passes through pipe 44 and pilot valve 25 to a low pressure pipe (not shown in the figure) and further to the low pressure tank in the unit 34. The lever 32 causes the sliding device 28 to move toward the left, as seen in the figure, the cams 29, 30, the dash pot 33 and lever 42 thereby returning the pilot valve 25 to its neutral position, thus bringing the piston 23 to a standstill. The leftward movement of the cam 31 causes the pilot valve 37 to move upwards, permitting the pressure oil to pass through pipe 38 and tube 7 to the under side of the piston 3, which moves upwards and through rod 4, links 45 and levers 46 actuates the blades 17 to turn to a smaller angle. The oil on the upper side of the piston 3 passes through passage 8, pipe 39 and pilot valve 37 to a low pressure pipe. Through the members 7, 41 and 40 the movement of the piston 3 is relayed to the pilot valve 37 which will return to its neutral position, thus causing the upward movement of the piston 3 to be stopped. The correct correlation of the guide vane opening and the runner blade angle is effected by the cam 31.

The servomotor cylinder 1 has a built-in sliding valve 9, which, actuated by the centrifugal force, at a certain rotating speed opens a connection channel 10 between the two cylinder chambers. The design of the valve device is shown in Fig. 3. A movable slide 11 is fitted into a radial hole in the servomotor cylinder. It is pressed towards the stop 13 in the cylinder by the spiral spring 12. The slide has a through hole 14, by means of which it is balanced for oil pressure in its direction of movement. Around the slide, in the cylinder, there is a channel 15, from which the channel 10 originates.

When the turbine is at a standstill, the slide is pressed up towards the stop 13 by the spring, but when the turbine has reached its normal rotating speed, owing to the centrifugal force, the slide is able to compress the spring somewhat, so that it takes the position shown in the figure. If the rotating speed increases above the normal speed, the slide moves further out, compressing the spring, and at a certain rotating speed the channel 15 will be uncovered, whereby the two cylinder chambers in the servomotor will be connected to each other, the difference in pressure disappears, the servomotor will be rendered inactive.

The function of the device according to the invention will thus be as follows, assuming that any of the following conditions exists which will cause the turbine to reach a runaway speed, viz.:

That the speed regulator has ceased to function and thus does not shut off the turbine when the rotating speed increases.

That there is an oil pressure but owing to certain defects the regulating slides have been set in such a way that the guide vane is entirely open and the runner blade is set at a small angle, That the load on the turbine is entirely removed.

The rotating speed will then rapidly increase, and because of this, as well as the incorrect combination, the runner blades tend to turn up at a greater angle. Owing to the pressure in the servomotor, however, this movement is prevented. When the valve 9 begins to function, however, the servomotor will become inactive, the blades can open to the maximum angle, and the runaway speed is limited to the corresponding value.

The reason why the spring 12 is made in such a way that at the normal speed the slide will not come to bear against the stop 13 is that, at least when the turbine is started or stopped, the slide moves a little, and any possible tendency of its sticking is thereby prevented.

The valve and the channels 10 and 15 must be dimensioned in such a way that, in spite of the oil feed to the lower cylinder chamber, the piston can move to the lowest position corresponding to the greatest angle of the runner blades in so short a time that the turbine will not have become accelerated up to a higher runaway speed than the speed obtained with the maximum angle of the blades. Because of this, but also for safety reasons, it is advisable to use 2 or more of the valves 9.

The device can be used also for blade wheel servomotors of designs other than that of the one herein described, e. g. for motors in which the slide for the blade wheel regulation is placed in the servomotor. The oil flowing through the valve 9 can then be let out through the drain channel from the servomotor instead of to the other cylinder chamber.

The device is, of course, independent of the positioning of the blade wheel servomotor in the rotating system.

Instead of the valve 9 in the servomotor cylinder, it is also possible to use a device actuated by the centrifugal force, which in turn actuates the valve that normally regulates the oil pressure in the servomotor, so that at a certain speed the valve will be set in such a way that the servomotor opens the runner blades to the maximum angle. The function will then depend on the regulating valve, however, and if this valve should be defective, the device will not meet the requirements for dependability which apply to protective device of this kind.

What I claim is:

1. In a hydraulic propeller turbine with angularly adjustable runner blades balanced to be angularly turned toward a position of maximum opening in response to an increasing rotational speed of the turbine and toward a position of maximum closing in response to a decreasing rotational speed of the turbine and wherein governing means responsive to the rotational speed of the turbine control the speed thereof by varying the angular position of the blades, the combination with safety means also controlled by the operational speed of the turbine and rendered operative by a rotational speed above a predetermined maximum value, the said safety means controlling said governing means and, when operated, render said governing means inoperative for control of the angular position of the blades thereby freeing the blades for angular movement into the position of maximum opening for limiting the turbine to a runaway speed corresponding to the maximum blade opening.

2. In a hydraulic propeller turbine with angularly adjustable runner blades balanced to be angularly turned toward a position of maximum opening in response to an increasing rotational speed of the turbine and toward a position of maximum closing in response to a decreasing rotational speed of the turbine wherein speed governing means responsive to the rotational speed of the turbine control the speed thereof by varying the angular position of the blades, the said governing means including servomotor means for effecting angular turning of the blades in either direction, the combination with safety means also controlled by the rotational speed of the turbine and controlling a by-pass duct by-passing said servomotor means, the said safety means including a movable control member responsive to the rotational speed of the turbine for closing said duct below a predetermined rotational maximum speed of the turbine and opening the duct above the said speed, the opening of said duct rendering said servomotor means inoperative for the angular turning of the blades thereby freeing the blades for angular movement into the position of maximum opening for limiting the turbine to a runaway speed corresponding to the maximum blade opening.

3. A turbine according to claim 2, in which the said servomotor means comprise a closed cylinder rotary with the rotational speed of the turbine, a piston for controlling the angular position of the blades slidable in said cylinder so as to form two chambers therein and distributing means for feeding operating fluid to either one of said chambers, and wherein said safety means comprise as movable member valve means rotary with the rotational speed of the turbine and included in said by-pass duct, said duct interconnecting said chambers, the said valve means being set to close the duct below said predetermined rotational speed of the turbine and to open the duct above the said speed.

4. A turbine according to claim 3, wherein said valve means are supported by said servomotor means for rotation jointly therewith thereby subjecting the valve means to the centrifugal force generated by the rotation of the turbine.

5. A turbine according to claim 4, wherein said valve means comprise a plunger, spring means biasing the plunger into a position closing the duct, and stop means limiting the displacement of the plunger by the action of said spring means.

6. A turbine according to claim 5, wherein said spring means are set so that the plunger occupies a position spaced apart from the stop means but maintaining closed said duct in response to the centrifugal force generated by the turbine rotating approximately at a predetermined normal running speed whereby the plunger is freely movable in either direction when the turbine is rotating at approximately normal running speed.

7. A turbine according to claim 6, wherein the said plunger is disposed perpendicularly to the rotational axis of said servomotor means.

8. A hydraulic turbine comprising a runner having pivotally adjustable blades thereon, the blades and the pivots thereof being so connected that said blades are hydraulically unbalanced for movement toward the open position of said blades at speeds above normal, and positioning means interconnected with said blades and operable normally to maintain said blades in desired positions of operation and vary the same to produce a desired turbine output at normal speed, in combination with a runaway speed limiting mechanism comprising a closed cylinder mounted for rotation in unison with the runner of the turbine, a piston in said cylinder coupled with the runner blades to control the angular position of the blades by the position of the piston in the cylinder, conduits for feeding pressure fluid to the cylinder spaces on either side of the piston, the feed of fluid to the cylinder being normally controlled by said positioning means, a relief conduit interconnecting the cylinder spaces on both sides of the piston, and a control valve controlling the flow of fluid through said relief conduit and mounted on the cylinder for rotation in unison therewith, said valve including a movable valve member controlled by the centrifugal force acting upon it when the cylinder rotates and biased to occupy a position closing said relief conduit in response to the normal speed of the turbine and to occupy a position opening said relief conduit in response to a speed of the turbine above said normal speed thereby freeing the blades to be moved into the open positions by said hydraulic unbalance of the blades.

9. A safety means according to claim 8, wherein said movable valve member comprises a plunger displaceable transversely of the rotational axis of the cylinder, and wherein loaded spring means bias the plunger into its position closing said relief conduit.

10. A safety means according to claim 9, wherein a stop means is provided for said plunger and wherein said spring means bias said plunger against said stop means and are loaded to permit movement of the plunger into an intermediate position spaced apart from said stop means but maintaining closed said relief duct in response to a rotation of the turbine at approximately the normal speed thereof.

11. A hydraulic turbine comprising a runner having pivotally adjustable blades thereon, the blades and pivots thereof being so connected that said blades are hydraulically unbalanced for movement toward the open positions of said blades at speeds above normal, and positioning means interconnected with said blades and operable normally to maintain said blades in desired positions of operation and vary the same to produce a desired turbine output at normal speed, in combination with a runaway speed limiting mechanism interconnected with said normal positioning means and operable automatically at speeds of a predetermined amount above normal to free the blades from the control of said normal positioning means and permit the said hydraulic unbalance of said blades to move the same toward said open positions thereof, thereby limiting the runaway speed of the turbine to a value corresponding to that of the open position of the blades to which they have been moved by said hydraulic unbalance.

12. A hydraulic turbine wherein according to claim 11 said runaway speed limiting mechanism comprises releasing means for freeing the blades from the control of said positioning means operable at normal speed, and control means inoperative at normal speed and responding to speeds in excess of said normal speed to operate said release means for freeing the blades.

13. A hydraulic turbine according to claim 11 wherein said normal speed positioning means comprises fluid operated power means controlling the position of the blades, a fluid relief duct by-passing said power means, and control means normally closing said relief duct and responsive to a speed in excess of normal speed to open said relief duct for freeing the blades from the control of the normal speed positioning means.

14. A hydraulic turbine according to claim 13 wherein said power means comprises a servomotor means including a cylinder and a plunger slidable in the cylinder drivingly connected with the blades, said relief duct interconnecting spaces in the cylinder on opposite sides of the plunger and said control means being included in said relief duct.

15. A hydraulic turbine according to claim 13 wherein said control means comprise spring actuated valve means biased into the duct closing position and movable into the duct opening position in response to a speed above the normal speed.

16. A hydraulic turbine according to claim 15 wherein said valve means comprise a stop means, said plunger being spring biased into a position abutting against said stop means when the turbine is at a standstill and movable into an intermediate position in response to a normal speed, said abutting plunger position and said intermediate position being both positions closing said relief duct.

References Cited in the file of this patent

UNITED STATES PATENTS 1,931,158    Biggs  ---------------- Oct. 17, 1933

(Other references on following page)

UNITED STATES PATENTS

| | | |
|---|---|---|
| 1,948,478 | Biggs | Feb. 20, 1934 |
| 1,950,775 | Biggs | Mar. 13, 1934 |
| 1,950,776 | Biggs | Mar. 13, 1934 |
| 1,962,382 | Biggs | June 12, 1934 |
| 2,284,295 | Moody | May 26, 1942 |
| 2,310,994 | Ring | Feb. 16, 1943 |
| 2,382,108 | Seewer | Aug. 14, 1945 |
| 2,407,454 | Seewer | Sept. 10, 1946 |

FOREIGN PATENTS

| | | |
|---|---|---|
| 127,850 | Switzerland | Nov. 1, 1928 |
| 661,104 | France | Feb. 26, 1929 |